United States Patent
Dallmeier

(10) Patent No.: US 11,012,618 B2
(45) Date of Patent: May 18, 2021

(54) MULTI-SENSOR CAMERA

(71) Applicant: Dallmeier electronic GmbH & Co. KG, Regensburg (DE)

(72) Inventor: Dieter Dallmeier, Pettendorf (DE)

(73) Assignee: Dailmeier electronic GmbH & Co., KG, Regensburg (DE)

( * ) Notice: Subject to any disclaimer, the term of this patent is extended or adjusted under 35 U.S.C. 154(b) by 31 days.

(21) Appl. No.: 16/490,690

(22) PCT Filed: Jul. 4, 2018

(86) PCT No.: PCT/EP2018/068062
§ 371 (c)(1),
(2) Date: Sep. 3, 2019

(87) PCT Pub. No.: WO2019/008019
PCT Pub. Date: Jan. 10, 2019

(65) Prior Publication Data
US 2020/0007762 A1    Jan. 2, 2020

(30) Foreign Application Priority Data
Jul. 5, 2017   (DE) .......................... 102017114962.7

(51) Int. Cl.
*H04N 5/232* (2006.01)
*H04N 5/247* (2006.01)
(Continued)

(52) U.S. Cl.
CPC ....... *H04N 5/23238* (2013.01); *H04N 5/2253* (2013.01); *H04N 5/2254* (2013.01); *H04N 5/247* (2013.01); *H04N 7/181* (2013.01)

(58) Field of Classification Search
CPC .... H04N 5/23238; H04N 7/181; H04N 5/247; H04N 5/23216; H04N 5/2251;
(Continued)

(56) References Cited

U.S. PATENT DOCUMENTS

| 6,473,119 B1 | 10/2002 | Teuchert |
| 2004/0041914 A1 | 3/2004 | Peters, III |

(Continued)

FOREIGN PATENT DOCUMENTS

| CN | 203069959 U | 7/2013 |
| CN | 103754379 A | 4/2014 |

(Continued)

*Primary Examiner* — Obafemi O Sosanya
(74) *Attorney, Agent, or Firm* — Welsh Flaxman & Gitler LLC

(57) ABSTRACT

The invention relates to a multi-sensor camera (1) including at least one housing (2) extending along a camera longitudinal axis (KLA) and having a flat housing base (3) running at least in portions perpendicularly to the camera longitudinal axis (KLA), and including a plurality of image sensor units (6, 6', 6.1-6.6), wherein one image sensor unit (6, 6', 6.1-6.6) includes a lens (6a, 6a') and an image sensor (6b, 6b') adjoining said lens along a sensor longitudinal axis (SLA). The image sensor units (6, 6', 6.1-6.6) are distributed concentrically around the camera longitudinal axis (KLA) and are arranged within the housing (2) and above the housing base (3) in such a way that the lenses (6a, 6a') of the image sensor units (6, 6', 6a-6.6) are oriented towards the camera longitudinal axis (KLA).

18 Claims, 7 Drawing Sheets

(51) Int. Cl.
*H04N 5/225* (2006.01)
*H04N 7/18* (2006.01)

(58) Field of Classification Search
CPC ............... H04N 5/2254; H04N 5/2258; G08B 13/19602; G08B 13/19628; G08B 13/19641
See application file for complete search history.

(56) References Cited

U.S. PATENT DOCUMENTS

| | | | |
|---|---|---|---|
| 2012/0242788 A1* | 9/2012 | Chuang | ............ G08B 13/19602 |
| | | | 348/36 |
| 2013/0013185 A1 | 1/2013 | Smitherman et al. | |
| 2015/0042851 A1 | 2/2015 | Ma et al. | |
| 2016/0042493 A1 | 2/2016 | MacMillan et al. | |
| 2016/0150142 A1 | 5/2016 | Lapstun et al. | |
| 2016/0191813 A1* | 6/2016 | Wu | ...................... H04N 5/2252 |
| | | | 348/159 |

FOREIGN PATENT DOCUMENTS

| | | |
|---|---|---|
| EP | 1301825 B1 | 3/2007 |
| EP | 3177009 A1 | 6/2017 |
| RU | 2014148026 A | 6/2016 |

\* cited by examiner

MULTI-SENSOR CAMERA

BACKGROUND OF THE INVENTION

The invention relates to a multi-sensor camera. In the field of professional video surveillance of larger-size surveillance areas, high demands are placed on the resolution of details of the recorded video data. The video systems used for this purpose comprise a multiplicity of cameras or video cameras, which are designed specifically for the video surveillance of diverse surveillance areas.

DIN EN 62676-4 in particular establishes a global standard for planning and agreement on the purposes of such video systems for surveillance. In particular, this standard contains a general classification of the required resolution based on the distance of the object to be imaged from the camera, expressed in the unit "pixel/meter". The specific categories of this classification are:

"Observation" (<125 pixel/meter),
"Recognition of known persons" (>125 pixel/meter) and
"Identification of an unknown person (>250 pixel/meter).

For a given distance of the objects to be imaged from the camera, according to the laws of geometrical optics, the resolution of details can be increased by increasing the pixel density of the image sensor, specifically the number of pixels per square millimeter, or by increasing the lens focal distance. However, an alternative option lies in constructing cameras with an increased detail resolution capacity by using a plurality of camera sensors and a plurality of lenses, which leads to the design of so-called multi-sensor cameras.

The camera head of such a multi-sensor camera comprises a multiplicity of image sensor units, wherein each image sensor unit comprises a lens and an associated image sensor, which preferably form a structural unit. With its image sensor units, the camera head of a multi-sensor camera scans different, generally slightly overlapping solid angle fields of a surveillance area. By virtue of the totality of the image content of all image sensor units, such multi-sensor cameras offer the advantage of being able to record larger solid angles with a relatively high resolution in relation to the location of the surveillance area (unit: pixel/meter in the distance x). Such multi-sensor cameras, which generate their image content with a plurality of image sensor units, are available from diverse manufacturers.

For example, German Patent No. DE 10 2011 103 378 B3 discloses a surveillance device having a plurality of cameras, in which the cameras are configured as multi-sensor camera units. The multi-sensor camera units are realized by so-called "multifocal camera technology". To this end, the image sensor units of the multi-sensor camera units, which record a scene to be monitored in which the distances of the objects vary substantially, are equipped with lenses with different focal distances. With the underlying and in some cases very different imaging scales of the individual image sensor units and very different pixel densities in relation to the different solid angles based on the solid angle in "pixel/angle" units, it is possible to guarantee a minimum resolution in relation to the distance of the object to the camera in "pixel/meter" units. With this property, it is possible to plan the video surveillance in a manner compliant with the resolution specified in DIN EN 62676-4 and to guarantee the recognizability of persons at a specified distance. German Patent No. DE 10 2011 103 378 B3 discloses in particular a method for representing the image content of image sensor units arising from imaging scales (lens focal distances), which can vary greatly depending on the sensor arrangement, and from the pixel densities resulting therefrom, which vary greatly in relation to the solid angles. With this method an overall image and any number of detailed views for the live mode and the synchronized playback mode can be generated and displayed on the monitor.

It is also desirable to be able to monitor interior spaces with only a limited number of cameras. To this end, use is often made of cameras mounted on the ceiling of the interior space to be monitored, which can record a horizontal field of view of 360° about the projection axis of the ceiling-mounted camera, which axis is perpendicular to the floor. Such 360° cameras may also already have a plurality of image sensor units, by means of which a plurality of image sections or room areas can be captured, which collectively give rise to a 360° image.

US Patent Application Publication No. 2016/0191813 A1 discloses an example of a multi-sensor camera comprising a plurality of image sensor units, which is designed for ceiling mounting. The camera comprises four image sensor units, which are received in a dome-like glass housing, wherein the glass housing adjoins to an annular base housing in which the further components of the camera are received and which is designed for ceiling mounting. In the mounted state, the dome-like glass housing receiving the image sensor units is arranged beneath the base housing and therefore at a distance from the room ceiling. Owing to this distance from the room ceiling, the four image sensor units of the camera specified in the illustrated exemplary embodiment are arranged relative to one another in such a way that their lenses point away from one another and their image detection zones are thus oriented outwards from the center or longitudinal axis of the camera, without crossing one another. A surveillance of the room in a 360° horizontal field of view is possible by means of the four image sensor units, wherein a 90° horizontal field of view can be captured by each image sensor. However, a disadvantage in this case is the fact that the floor area directly beneath the camera can only be partially captured by these image sensor units with their respective longitudinal axes oriented diagonally outwards. In order to capture the 360° horizontal field of view, the image sensor units (or rather their lenses) in a ceiling-mounted camera or ceiling camera are each mounted lower than and at a distance from the ceiling in a dome-like glass housing, in order to ensure an unobstructed view, from the camera longitudinal axis outwards, of the room areas to be captured. A disadvantage lies in the fact that such a multi-sensor camera cannot be flush-mounted in a ceiling.

Examples of cameras configured similarly to ceiling-mounted cameras and comprising a plurality of image sensor units are known from Chinese Patent No. CN203069959U or Chinese Patent No. CN201639666U, which cameras in particular have additional image sensor units with which the room area directly under the ceiling-mounted camera can also be captured. In this case also, the image sensor units are arranged inside the camera housing beneath the ceiling in such a way that their detection zones extend radially outwards from the camera longitudinal axis, i.e., do not cross one another in the area of the camera housing. In this case also, a disadvantage lies in the fact that such a camera cannot be flush-mounted in a ceiling.

SUMMARY OF THE INVENTION

On the basis of this, it is an object of the present invention is to provide a multi-sensor camera of the aforementioned type, which can be installed, preferably flush-mounted, in a building ceiling and which is able to capture a 360° horizontal field of view.

An essential aspect of the multi-sensor camera according to the invention lies in the fact that the image sensor units are distributed concentrically around the camera longitudinal axis and arranged within the housing in such a way that the lenses of the image sensor units are oriented towards the camera longitudinal axis or point away from the camera longitudinal axis, wherein at least one further image sensor unit is provided, the sensor longitudinal axis of which runs parallel to the camera longitudinal axis and which has a fisheye lens. Particularly advantageously, an overview video image can be generated using the image sensor unit having a fisheye lens, wherein the image sensor units arranged annularly around the camera longitudinal axis are designed for generating detailed video images. To this end, the image sensor units have, for example, different resolutions. In a particularly advantageous manner, the multi-sensor camera according to the invention can be used to capture individual room areas in different resolutions by means of at least two image sensor units, and when displaying the recorded video image on a monitor unit, it is possible to switch between the overview video image and the individual detailed video images and thus "zoom in on" individual solid angle regions of a 360° video image with increased resolution.

In an embodiment of the invention, the image sensor units are distributed concentrically around the camera longitudinal axis and arranged above a housing base, specifically in such a way that the lenses of the image sensor units are oriented towards the camera longitudinal axis. In a particularly advantageous manner, the image sensor units in this embodiment are arranged with respect to the camera longitudinal axis completely within the housing, which can be flush-mounted in a ceiling, and with their respective lenses oriented towards the camera longitudinal axis. The detection zone of each image sensor unit initially extends via the interior space of the housing and the image capture aperture or optically transparent flat cover plate to the outside. In other words, the detection zones of the image sensor units already cross one another in the area of the camera, specifically in the interior of the housing, thus enabling the camera to be flush-mounted in a ceiling in a particularly advantageous manner. The image sensor units received in the housing are thus oriented opposite one another; specifically, the detection zone of a given image sensor unit extends beneath and thus past the opposing image sensor unit in the housing.

In an advantageous embodiment, the sensor longitudinal axes of the image sensor units each form an acute angle with the camera longitudinal axis, wherein the setting angle of the image sensor units with respect to the camera longitudinal axis is, for example, between 15° and 80°, preferably between 35° and 65°.

A further advantage is that the housing base has an image capture aperture, which can be closed by means of an optically transparent, flat and preferably detachable cover plate. The image capture aperture releases an open line of sight from the housing interior into the room to be monitored. In terms of its diameter, it is adapted accordingly to the concentric arrangement or the number and/or the setting angle of the image sensor units.

A further advantage is that the image sensor units are arranged in a mounting plane running perpendicularly to the camera longitudinal axis, wherein the mounting plane runs parallel to and at a distance from the housing base or cover plate of the housing. In particular, the image sensor units are arranged in the housing diagonally to one another in such a way that the sensor longitudinal axes thereof and the camera longitudinal axis intersect in a common virtual intersection point outside the housing. This gives rise to a symmetrical, in particular point-symmetrical, arrangement of the image sensor units with respect to the camera longitudinal axis in order to ensure video surveillance over a 360° horizontal detection zone.

A further advantage is that the image sensor units are arranged annularly distributed around the camera longitudinal axis within the housing, each having preferably the same radial distance from the camera longitudinal axis. In order to ensure the arrangement described within the housing in an expedient and trouble-free manner, in one embodiment, for example, holding means for receiving the image sensor units are provided, which open in a dome-like manner towards the image capture aperture. These holding means together with the image sensor units, for example, can form a replaceable module, which simplifies the production and/or the maintenance of the multi-sensor camera.

In an advantageous embodiment at least one further image sensor unit is provided, the sensor longitudinal axis of which runs parallel to or coincides with the camera longitudinal axis. The room area directly beneath the multi-sensor camera can be captured with this sensor unit. In a particularly advantageous manner, for example, at least four image sensor units and at least one further image sensor unit are provided.

A further advantage is that the image sensor units with their lenses pointing diagonally to the camera longitudinal axis are arranged in a first mounting plane running parallel to and distanced from the housing base or cover plate of the housing, whereas at least one further image sensor unit is arranged in a second mounting plane oriented parallel to the first mounting plane. If two further image sensor units are provided, these units can also be arranged in a second and/or third mounting plane, which in each instance run parallel to the first mounting plane.

However, obviously it is also possible to arrange four, six or eight image sensor units diagonally to the camera longitudinal axis and distributed concentrically around the camera longitudinal axis within the housing, whereas at least one further image sensor unit can be arranged in the housing, the sensor longitudinal axis of which coincides with the camera longitudinal axis, and at least one still further image sensor unit can be received in the housing base, the sensor longitudinal axis of which runs parallel to the camera longitudinal axis. The described arrangement of image sensor units enables video surveillance over a 360° horizontal detection zone.

A further advantage is that the housing is designed to be installed in such a way that the housing base is flush with a building ceiling. The housing base, in particular by virtue of its design, enables such a flush-mounting on a building ceiling, particularly in the case of a camera guided through an opening in the building ceiling.

In a preferred embodiment, the image sensor units have lenses having the same or different focal distances.

A further advantage is that the image sensor units and/or the further image sensor units are configured for capturing individual high-resolution digital images.

Owing to the inventive arrangement of the image sensor units within the housing, in a particularly advantageous manner this arrangement has detection zones which cross one another in the area of the housing, in particular in the area of the housing interior. If at least one further image sensor unit is used, the detection zones of the image sensor units and of at least one of the further image sensor units also cross one another.

Further developments, advantages and possible applications of the invention also arise from the following description of exemplary embodiments and from the figures. All features described and/or represented by illustration, alone or in any combination, in principle constitute the subject matter of the invention, irrespective of their summarization in the claims or their back-references. The content of the claims is also made an integral part of the description.

BRIEF DESCRIPTION OF THE DRAWINGS

The invention is explained in more detail in the following based on exemplary embodiments and with reference to the figures, wherein.

DETAILED DESCRIPTION OF THE INVENTION

Figure 1:
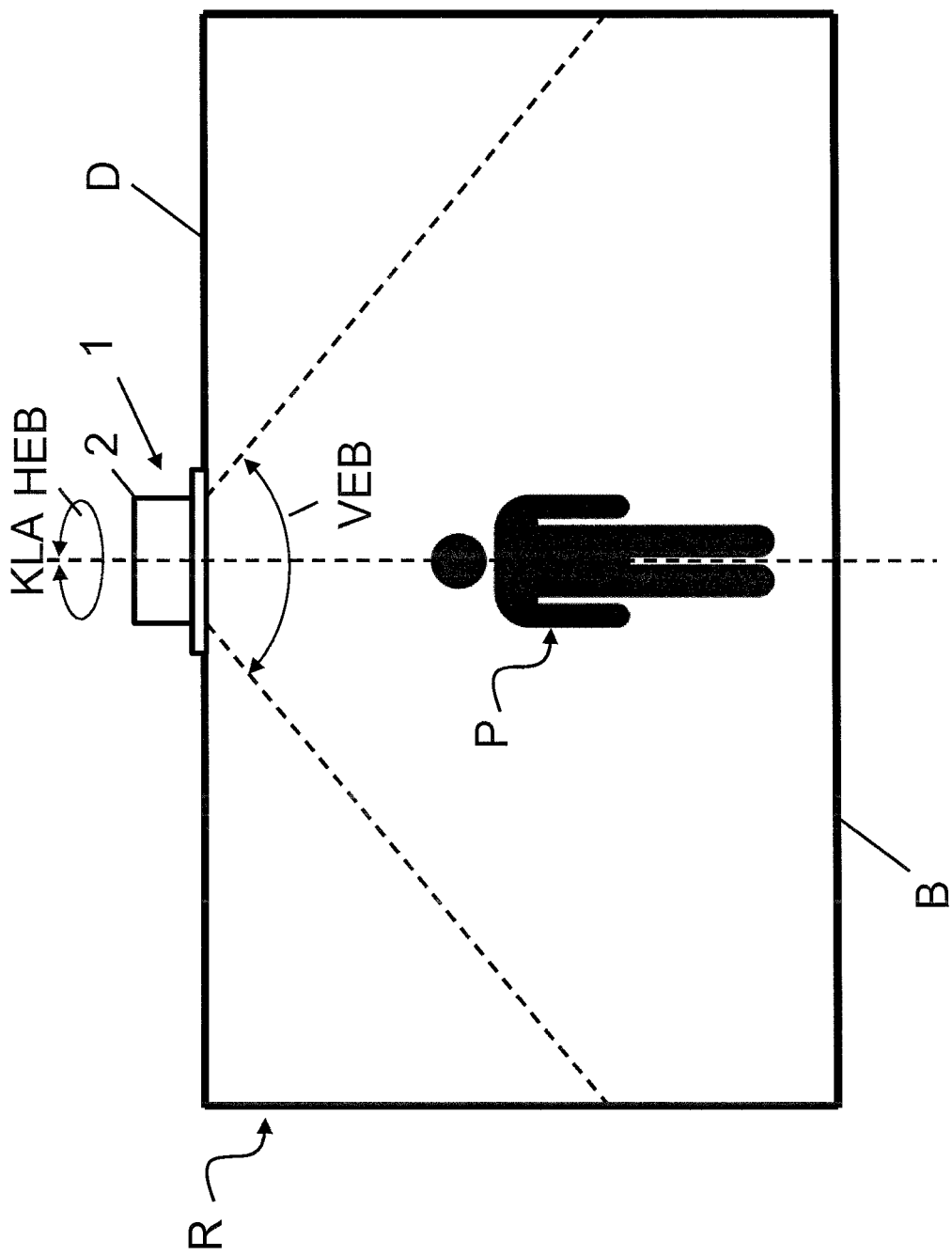
FIG. 1 shows a schematic side view of a multi-sensor camera according to the invention for the video surveillance of a room, which camera is flush-mounted in the room ceiling.

FIG. 1 shows a schematic side view of a room R, which is video monitored by means of a multi-sensor camera 1 according to the invention flush-mounted in the ceiling D of the room R.

To this end, in the illustrated exemplary embodiment, the multi-sensor camera 1 according to the invention is integrated in the ceiling D in a center-area of the room R, specifically flush with the surface of the ceiling D facing the interior of the room R or the floor B of the room R.

In the sense of the invention, flush-mounting a multi-sensor camera 1 is understood to mean the installation of the multi-sensor camera 1 in a level area of a room ceiling D in such a way that the lower side of the multi-sensor camera 1 does not or else only slightly protrudes into the inner room R, thus maintaining at least the visual impression of a level, closed room ceiling D even after the multi-sensor camera 1 has been installed. Although prior art dome cameras or cameras with fisheye lenses can be fastened to the room ceiling D, but in contrast to the multi-sensor camera 1 according to the invention they protrude into the room R in an at least partially noticeable manner, in other words they are definitely not mounted flush with the room ceiling D.

The multi-sensor camera 1 according to the invention preferably has a 360° horizontal detection zone HEB and an at least 140°, preferably at least 180°, vertical detection zone VEB. From a camera longitudinal axis KLA running vertically to the room ceiling R or room floor B in the installed state, the 360° horizontal detection zone HEB thus extends around the camera longitudinal axis KLA and the vertical detection zone VEB extends at least +/−70° around the vertical camera longitudinal axis KLA. The multi-sensor camera 1 according to the invention is thus a 360° camera, which is used in the field of video surveillance of preferably closed rooms. A 360° and therefore complete capture of the scenes taking place in the defined detection zone is possible. In past multi-sensor cameras having a 360° horizontal detection zone HEB, the image sensor units are always situated lower than the room ceiling D. The is where the invention starts.

The multi-sensor camera 1 according to the invention comprises at least one housing 2 extending along the camera longitudinal axis KLA and having a housing bottom 2.1, at least one lateral housing wall 2.2 and a housing top 2.3. The housing bottom 2.1 has a level housing base 3 running, at least in sections, perpendicularly to the camera longitudinal axis KLA, which base is provided with an image capture aperture 4, which can be closed by means of an optically transparent, flat and preferably detachable cover plate 5.

The cover plate 5 is preferably made of glass or transparent plastic and can also be formed, for example, from one or multiple parts. In case of an image capture aperture 4 closed by means of the cover plate 5, a preferably closed housing interior 2' arises, which is enclosed by the housing base 3, the housing wall 2.2 adjoining thereto along the adjacent camera longitudinal axis KLA, and the housing top 2.3 opposite the housing base 3.

According to the invention, a plurality of image sensor units 6, 6' for capturing individual high-resolution digital images, are provided in the housing 2 or in the housing interior 2'. Such image sensor units 6, 6' each extend along a sensor longitudinal axis SLA and each have a lens 6a, 6a' and an image sensor 6b, 6b' adjoining thereto along a sensor longitudinal axis SLA. In this case the sensor longitudinal axis SLA preferably corresponds or at least runs parallel to the optical axis of the lenses 6a, 6a'. The image sensor units 6, 6' are arranged concentrically distributed around the camera longitudinal axis KLA above the housing base 3 and within the housing 2 or housing interior 2', specifically in such a way that the lenses 6a, 6a' of the image sensor units 6, 6' are oriented towards the camera longitudinal axis KLA. The optical axes of the lenses 6a, 6a' are thus oriented towards the camera longitudinal axis KLA and thus cross one another in the area of the camera 1.

For example, the sensor longitudinal axis SLA of an image sensor unit 6, 6' in each instance defines an acute angle w, w' with the camera longitudinal axis KLA. In a preferred embodiment, the acute angle w, w' is between 15° and 80°, preferably between 35° and 65°.

The inclined arrangement of the image sensor units 6, 6' with respect to the camera longitudinal axis KLA and the concentric, preferably annular distribution of the same around the camera longitudinal axis KLA permits both a 360° image capture by means of image sensor units 6, 6' installed entirely in the housing interior 2' and flush-mounting in a ceiling.

Figure 2:
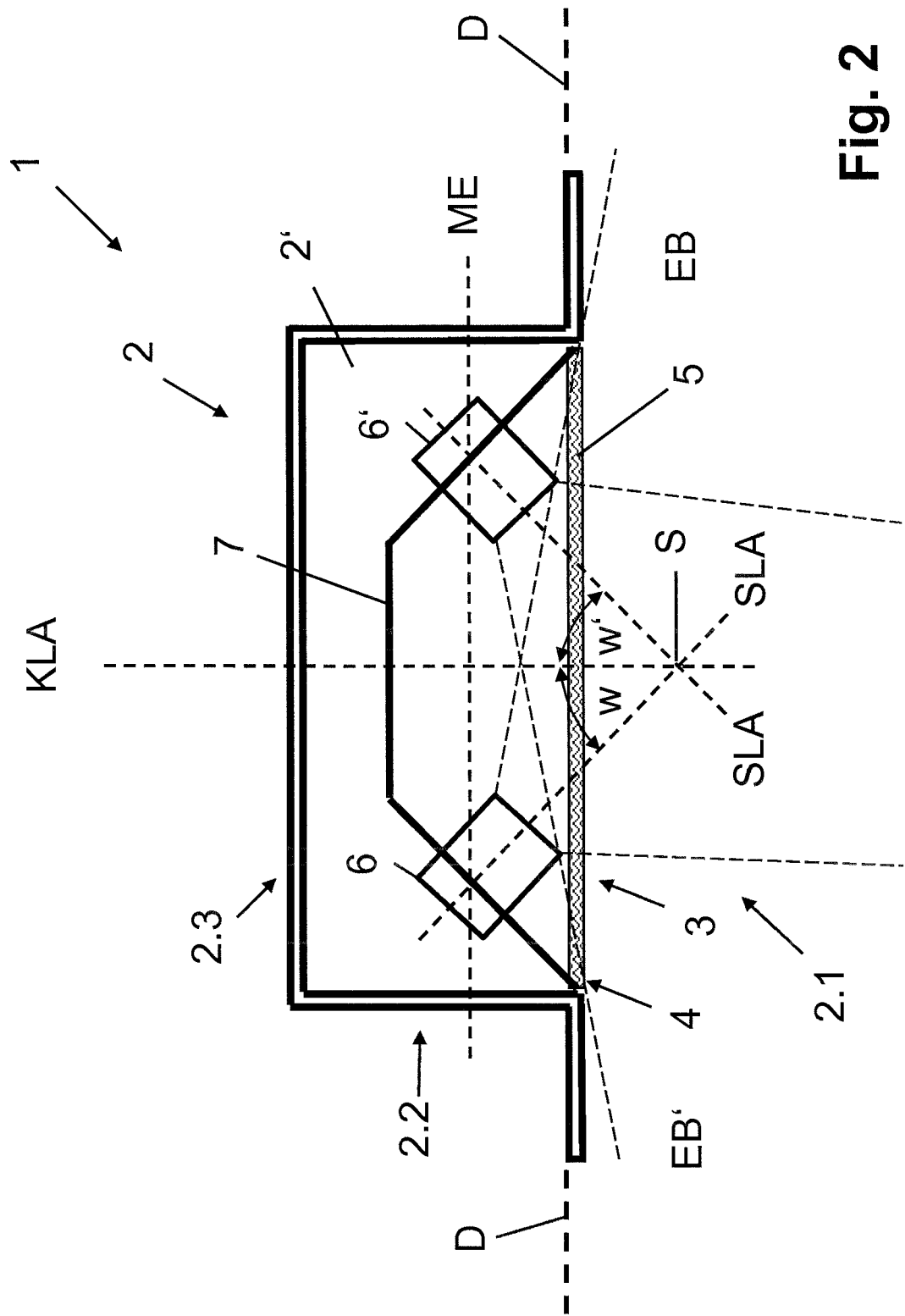
FIG. 2 shows a schematic sectional view through a multi-sensor camera according to the invention, which is flush-mounted in the room ceiling.

By way of an example, a schematic sectional view through a multi-sensor camera 1 according to the invention mounted flush with the room ceiling D is illustrated in FIG. 2, in which only two image sensor units 6, 6' are shown by way of an example.

The image sensor units 6, 6' are preferably arranged in a mounting plane ME, which runs perpendicularly to the camera longitudinal axis KLA and which runs parallel to and at a distance from the housing base 3 or cover plate 5 of the housing 2 of the multi-sensor camera 1. The image sensor units 6, 6' are preferably arranged in the housing 2 diagonally to one another in such a way that the sensor longitudinal axes SLA thereof and the camera longitudinal axis KLA intersect in a common virtual intersection point S outside the housing 2. The intersection point is situated below the housing 2 or housing base 3. The image sensor units are preferably arranged annularly distributed around the camera longitudinal axis KLA within the housing 2 and in each case have the same radial distance to the camera longitudinal axis KLA. In the arrangement according to the invention, the detection zones EB, EB' of the individual image sensor units 6, 6' extend outwards starting from the housing interior 2' via the image capture aperture 4 or via the transparent, planar cover plate 5 closing said aperture.

For fastening the image sensor units 6, 6', provision can be made of, for example, holding means 7 in the housing 2 for the receipt and preferably releasable fastening of said units. The holding means open in a dome-like manner towards the image capture aperture 4. In this exemplary embodiment, the holding means 7 are formed by a dome-like holding structure comprising a multiplicity of strut and planar elements, which enable the image sensor units 6, 6' to be releasably fastened in the specified holding position extending diagonally to the camera longitudinal axis KLA. In this holding position, the objectives or lenses 6a, 6b' are oriented towards the camera longitudinal axis KLA. To this end, this dome-like holding structure 7 comprises for example a trapezoidal cross section, the underside of which is open and corresponds roughly to the contour of the image capture aperture 4. The dome-like holding structure 7 can also be configured as a module, which can be replaced together with the image sensor units 6, 6' fastened thereto for easy installation and/or maintenance.

Figure 3:
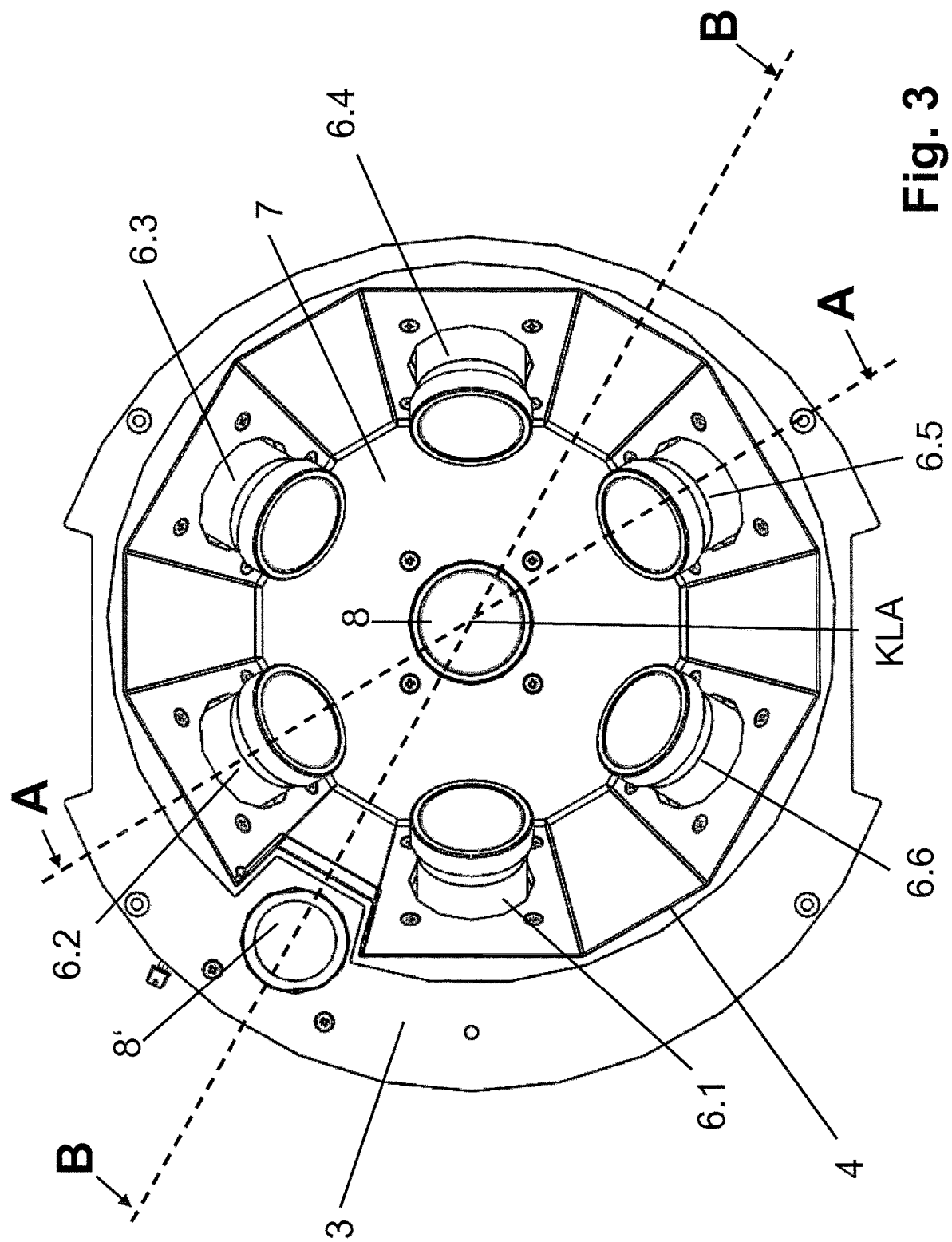
FIG. 3 shows a schematic planar view of the housing bottom, without the cover, of an embodiment variant of the multi-sensor camera according to the invention.

FIG. 3 shows a planar view of the housing bottom 2.1 of an embodiment variant of the multi-sensor camera 1 according to the invention, without the cover plate 5, in which for example six image sensor units 6, 6' are distributed concentrically around the camera longitudinal axis KLA, are arranged in the housing interior 2', and are each arranged at an acute angle w, w' to the camera longitudinal axis KLA. In this exemplary embodiment, the multi-sensor camera 1 has first to sixth image sensor units 6.1 to 6.6, respectively, which are arranged annularly and always at the same distance around the camera longitudinal axis KLA extending perpendicularly to the plane of the page.

According to the invention, provision is made of at least one further image sensor unit 8, 8', the sensor longitudinal axis SLA of which runs parallel to or coincides with the camera longitudinal axis KLA. In the exemplary embodiment, provision is made of a first and a second further image sensor unit 8, 8', wherein the first further image sensor unit 8 is arranged in the housing 2 or housing interior 2' in such a way that the sensor longitudinal axis SLA thereof coincides with the camera longitudinal axis KLA. The second further image sensor unit 8' is received in the housing base 3, preferably in the edge zone of the image capture aperture 4, in such a way that the sensor longitudinal axis SLA thereof runs parallel to the camera longitudinal axis KLA. As an alternative, the sensor longitudinal axes SLA of both further image sensor units 8, 8' can also run parallel to the camera longitudinal axis KLA.

The room area situated directly beneath the multi-sensor camera 1 can be captured by means of the further image sensor units 8, 8'. To this end, the first further image sensor unit 8 has, for example, the detection zone EB", indicated schematically in FIG. 6. According to the invention, one of the further image sensor units 8', namely the second further image sensor unit 8' in this embodiment, has a fisheye lens, by means of which a 360° recording can be made. The capture zone of the second further image sensor unit 8' having the fisheye lens extends across the entire room, in other words encompasses all detection zones EB, EB', EB" of the image sensor units 6, 6', 6.1 to 6.6 and of the first further image sensor unit 8, respectively.

The further image sensor unit 8' having the fisheye lens is thus an overview image sensor, which is provided for generating an overview video image. The first through sixth image sensor units 6.1-6.6, respectively, are detailed image sensors for generating detailed video images with significantly higher resolutions compared to the overview video image. A multi-sensor camera 1 according to the invention thus provides items of video information on a room area or recording area with varying detail resolutions, between which it is possible to switch in the scope of displaying the video image on a monitor.

Figure 4:
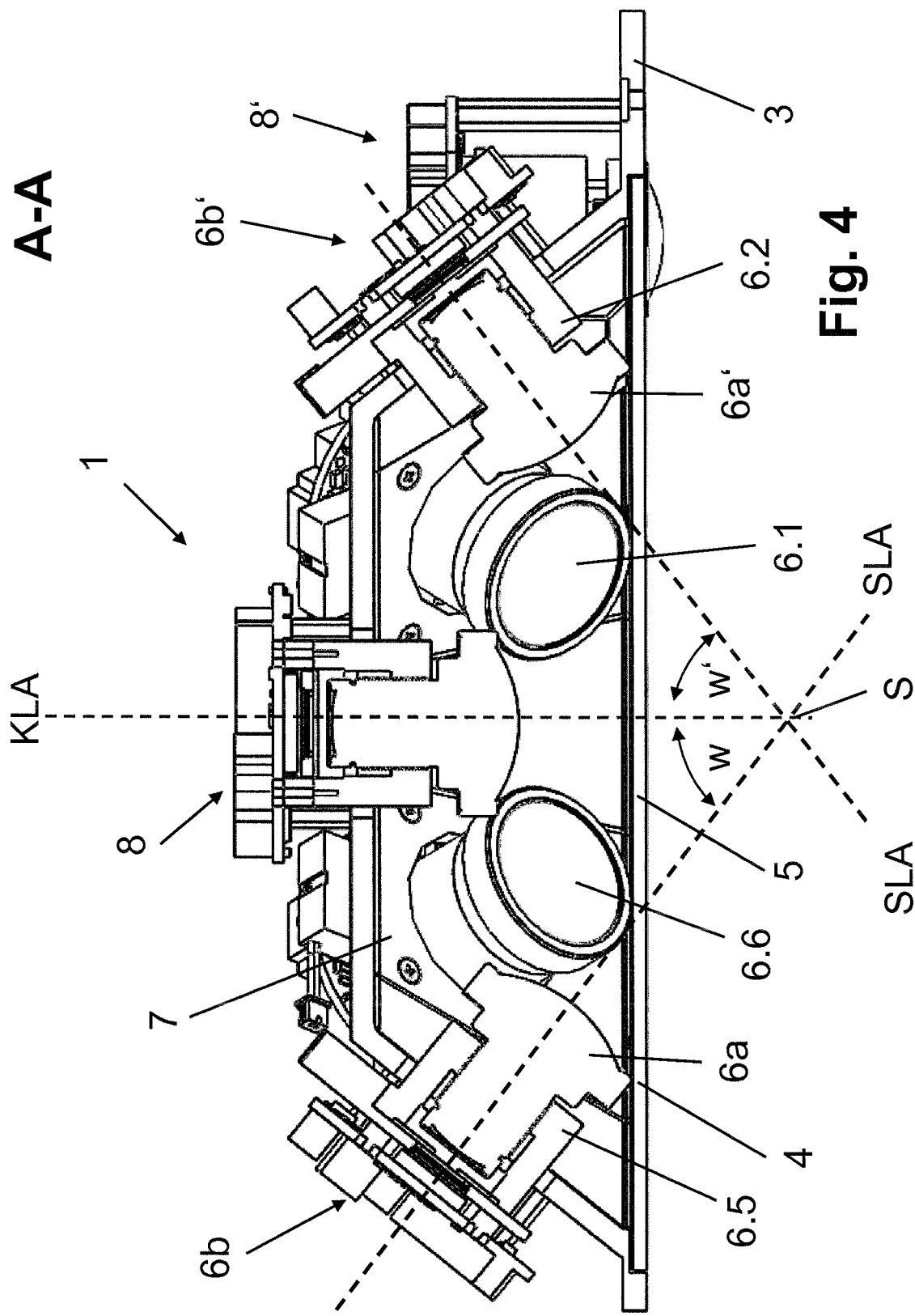
FIG. 4 shows a schematic section along the line A-A through the multi-sensor camera shown in FIG. 3 with the cover, but without the housing wall and the housing top.
Figure 5:
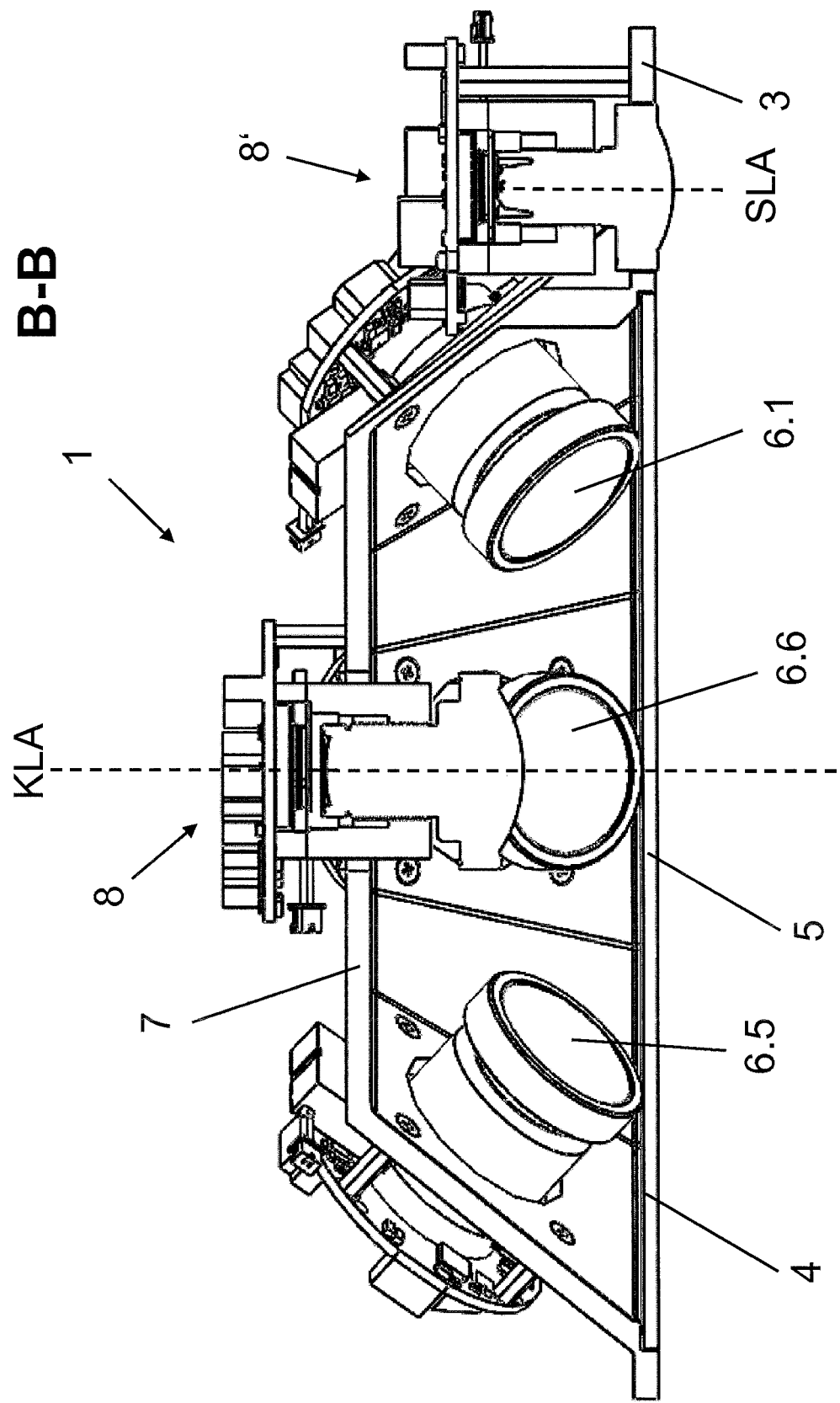
FIG. 5 shows a schematic section along the line B-B through the multi-sensor camera shown in FIG. 3 with the cover, but without the housing wall and the housing top.

A longitudinal section along the line A-A or B-B through the multi-sensor camera 1 according to FIG. 3 is shown in FIGS. 4 and 5, respectively, but with the cover plate 5. Furthermore, only the housing bottom 2.1 or housing base 3, but not the housing wall 2.2 and the housing top 2.3, are depicted in FIGS. 4 and 5.

Hence, eight image sensor units 6.1-6.6, 8, 8' in total are used in the exemplary embodiment according to FIGS. 3 through 5. However, the invention is not in any way limited to the depicted number of image sensor units 6.1-6.6 and further image sensor units 8, 8', respectively. Obviously, any number of image sensor units 6, 6' capable of being arranged in a mounting plane ME such that they are uniformly distributed around the camera longitudinal axis KLA can be installed, and any number of further image sensor units 8, 8' capable of being installed in the housing base 3 and/or in the housing interior 2' can also be installed, provided that doing so is deemed technically practical. Preference is given to arranging four, six or eight image sensor units 6, 6' within the housing 2 diagonally to the camera longitudinal axis KLA and distributed concentrically around the camera longitudinal axis KLA.

FIG. 4 also shows a section through two opposite image sensor units 6, 6', from which the arrangement of the lenses 6a, 6a' and the associated image sensors 6b, 6b' along the respective sensor longitudinal axes SLA can be discerned.

The image sensor units 6, 6' or further image sensor units 8, 8' can have lenses 6a, 6a' with the same or different focal distances. When using lenses 6a, 6a' with different focal distances, surveillance zones situated further away from the multi-sensor camera 1 in the room R can also be recorded with a higher resolution in relation to the solid angle in "pixel/angle" units than can room zones situated closer to the multi-sensor camera 1 by means of the image sensor units 6, 6' or further image sensor units 8, 8'.

In a preferred embodiment, all room zones of a room R to be monitored are captured in high resolution by means of the multi-sensor camera 1, regardless of the distance from the multi-sensor camera 1, and recorded in one or a plurality of recorders connected to the multi-sensor camera 1, preferably digital recorders of a surveillance system.

Figure 6:
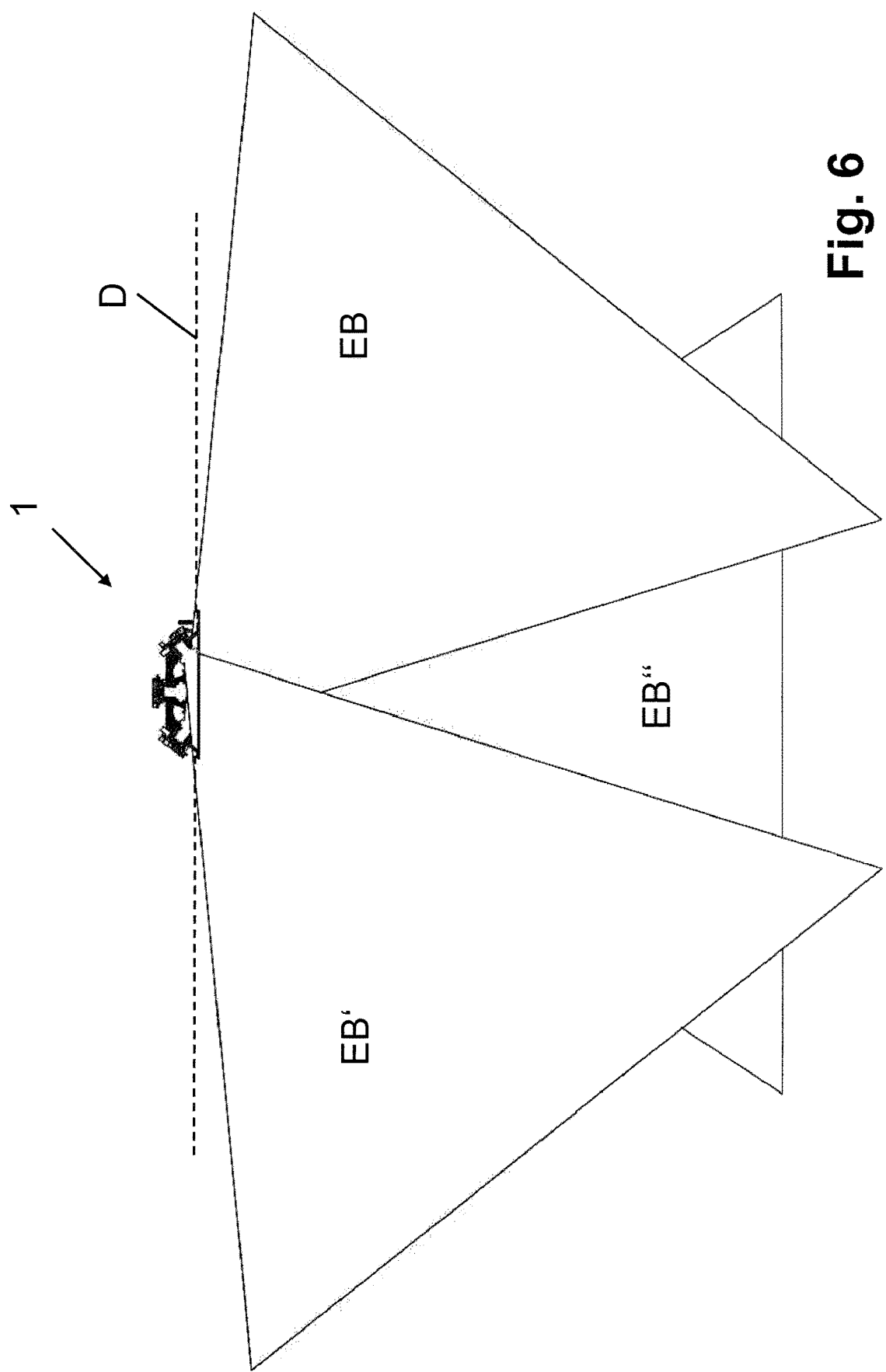
FIG. 6 shows a lateral view of the schematically illustrated detection zones of individual image sensor units of a ceiling-mounted multi-sensor camera.

By way of example, FIG. 6 depicts the detection zones EB, EB', EB" of the image sensor units 6, 6' and of a further image sensor unit 8 in a schematic, side view of a ceiling-mounted multi-sensor camera 1 shown in profile. From this it is clearly discernible that the detection zones EB, EB', EB" already cross one another within the housing 2.

Figure 7:
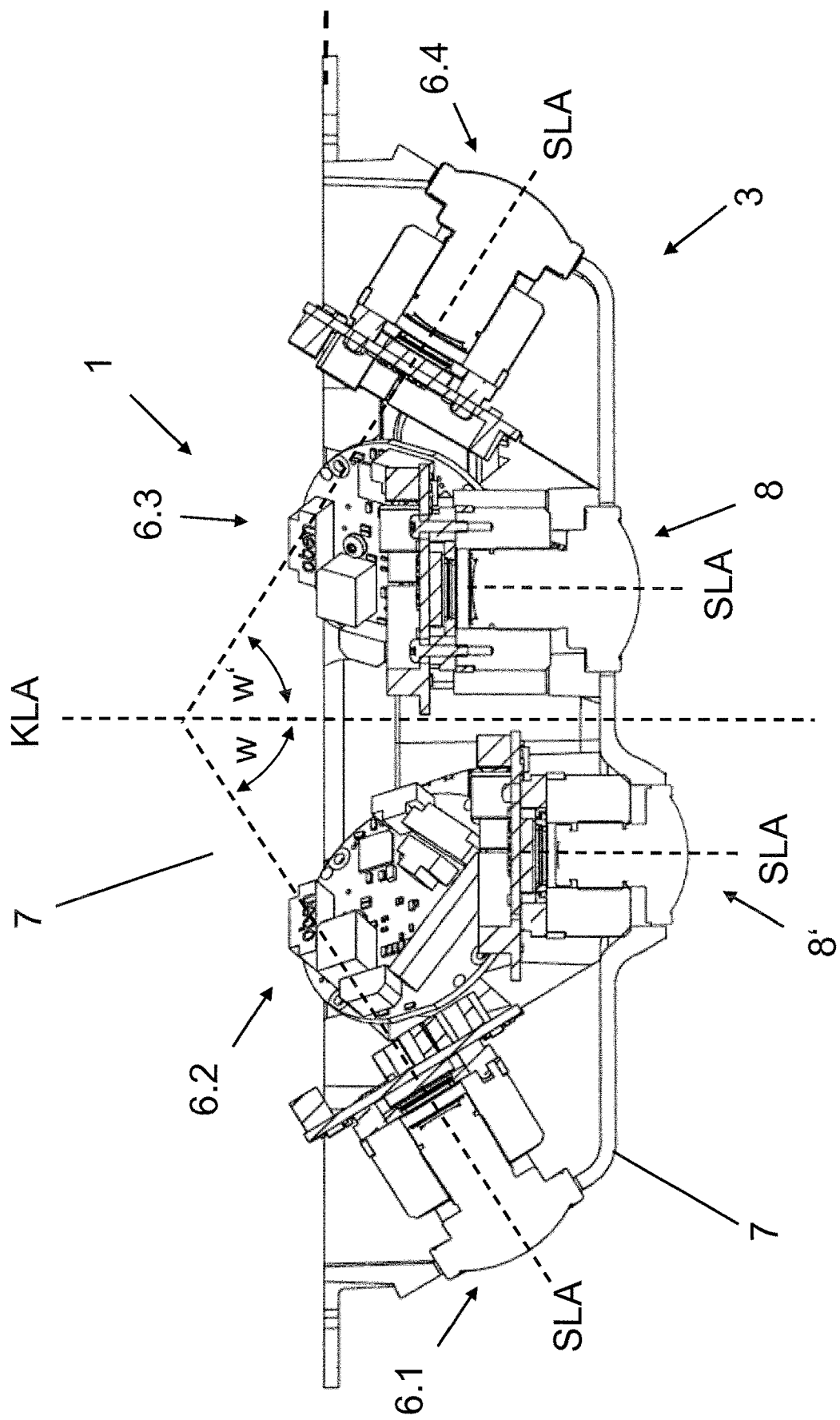
FIG. 7 shows a schematic sectional view, analogous to that of FIG. 5, through the housing of a multi-sensor camera according to the invention having an alternative arrangement of the image sensor units.

By way of example, FIG. 7 shows a schematic sectional view analogous to that of FIG. 5 through an alternative embodiment of a multi-sensor camera 1, in which the lenses 6a, 6a' of the image sensor units 6.1-6.6 are oriented towards the camera longitudinal axis KLA or point away from the camera longitudinal axis KLA. In this case also, the sensor longitudinal axes SLA of the image sensor units 6.1-6.6 define an acute angle w, w' with the camera longitudinal axis KLA, wherein the sensor longitudinal axes SLA of the further image sensor units 8, 8' run parallel to the camera longitudinal axis KLA. In this embodiment variant of the multi-sensor camera 1, the holding means 7 are also formed by a dome-like holding structure, which has, for example, a trapezoidal cross section and is open to the housing top 2.3. The dome-like holding structure 7 preferably also forms the housing bottom 2.1 or housing base 3, so that an image capture aperture 4 can be omitted. The image sensor units 6.1-6.6 are also arranged annularly distributed around the camera longitudinal axis KLA within the housing 2, wherein the further image sensors 8, 8' have a smaller radial distance from the camera longitudinal axis KLA than the image sensor units 6.1-6.6 surrounding this axis. The further image sensors 8, 8' are thus received or arranged in the "sensor ring" formed by the image sensor units 6.1-6.6. In this holding position, the objectives or lenses of the image sensor units 6.1-6.6 point away from the camera longitudinal axis KLA, i.e., are oriented outwards. The dome-like holding structure 7 can also be configured as a module such that it is possible to remove the structure together with the attached image sensor units 6.1-6.6 and further image sensor units 8, 8' for easy installation and/or maintenance.

The invention was described in the preceding with reference to exemplary embodiments. Obviously, numerous modifications and variations are possible without departing from the fundamental inventive concept of the invention.

LIST OF REFERENCE SIGNS

1 Multi-sensor camera
2 Housing
2' Housing interior
2.1 Housing bottom
2.2 Housing wall
2.3 Housing top
3 Housing base
4 Image capture aperture
5 Transparent, planar cover plate
6, 6' Image sensor unit
6a, 6a' Lens
6b, 6b' Image sensor
6.1-6.6 First through sixth image sensor unit(s)
7 Holding means
8, 8' Further image sensor unit(s)
B Floor
D Ceiling
EB, EB', EB" Detection zones
HEB Horizontal detection zone
ME Mounting plane
P Person
R Room
S Common virtual intersection point
VEB Vertical detection zone
w, w' Acute angle

The invention claimed is:

1. A multi-sensor camera comprising:
   at least one housing extending along a camera longitudinal axis and having a housing base running, at least in sections, perpendicular to the camera longitudinal axis;
   a first group of at least three image sensor units, wherein each of the at least three image sensor units comprises a lens and an image sensor adjoining thereto along a sensor longitudinal axis, wherein the at least three image sensor units are distributed concentrically around the camera longitudinal axis and are arranged within the at least one housing in such a way that the lenses of the at least three image sensor units are oriented towards the camera longitudinal axis or point outwards from the camera longitudinal axis,
   a secondary image sensor unit is provided in the at least one housing, a sensor longitudinal axis of the secondary image sensor unit coincides with the camera longitudinal axis; and
   a tertiary image sensor unit comprising a fisheye lens located in the at least one housing, a sensor longitudinal axis of the tertiary image sensor unit runs parallel to the camera longitudinal axis.

2. The multi-sensor camera according to claim 1, wherein the sensor longitudinal axes of the at least three image sensor units each define an acute angle with the camera longitudinal axis.

3. The multi-sensor camera according to claim 1, wherein the housing base comprises an image capture aperture, which can be closed by an optically transparent, flat and detachable cover plate.

4. The multi-sensor camera according to claim 1, wherein the at least three image sensor units are arranged in at least one mounting plane running perpendicular to the camera longitudinal axis.

5. The multi-sensor camera according to claim 4, wherein the at least one mounting plane runs parallel to and at a distance from the housing base or cover plate of the housing.

6. The multi-sensor camera according to claim 1, wherein the at least three image sensor units are arranged diagonally to one another in the housing in such a way that the sensor longitudinal axes thereof and the camera longitudinal axis intersect in a common virtual intersection point outside the housing.

7. The multi-sensor camera according to claim 1, wherein the at least three image sensor units are arranged annularly distributed around the camera longitudinal axis within the housing.

8. The multi-sensor camera according to claim 1, wherein the at least three image sensor units each have a same radial distance from the camera longitudinal axis.

9. The multi-sensor camera according to claim 1, wherein holding means are provided within the housing for receiving the at least three image sensor units.

10. The multi-sensor camera according to claim 9, wherein the holding means open in a dome manner towards the image capture aperture or towards a housing top.

11. The multi-sensor camera according to claim 1, wherein at least four image sensor units and at least two further image sensor units are provided.

12. The multi-sensor camera according to claim 1, wherein four, six or eight image sensor units are arranged diagonally to the camera longitudinal axis and concentrically distributed around the camera longitudinal axis within the housing.

13. The multi-sensor camera according to claim 1, wherein the housing installed in a building ceiling with the housing base flush therewith.

14. The multi-sensor camera according to claim 1, wherein the at least three image sensor units have lenses having same or different focal distances.

15. The multi-sensor camera according to claim 1, wherein an acute angle is between 15° and 80°.

16. The multi-sensor camera according to claim 1, wherein the at least three image sensor units or the further image sensor units are for capturing individual high-resolution digital images.

17. The multi-sensor camera according to claim 1, wherein the at least three image sensor units comprise detection zones, which cross one another in an area of a housing interior.

18. The multi-sensor camera according to claim 17, wherein the detection zones of the at least three image sensor units and of the at least one of the second image sensor unit or the third image sensor unit cross one another.

* * * * *